(12) United States Patent
Habacker (10) Patent No.: US 7,780,218 B2
(45) Date of Patent: Aug. 24, 2010

(54) LOCKING DEVICE FOR A CONVERTIBLE TOP

(75) Inventor: Norbert Habacker, Bramsche (DE)

(73) Assignee: Wilhelm Karmann GmbH, Osnabrück (DE)

( * ) Notice: Subject to any disclaimer, the term of this patent is extended or adjusted under 35 U.S.C. 154(b) by 316 days.

(21) Appl. No.: 11/666,483

(22) PCT Filed: Oct. 13, 2005

(86) PCT No.: PCT/DE2005/001826

§ 371 (c)(1),
(2), (4) Date: Mar. 10, 2008

(87) PCT Pub. No.: WO2006/045269

PCT Pub. Date: May 4, 2006

(65) Prior Publication Data

US 2008/0258493 A1    Oct. 23, 2008

(30) Foreign Application Priority Data

Oct. 27, 2004 (DE) .......................... 10 204 052 236

(51) Int. Cl.
*B60J 7/19* (2006.01)
(52) U.S. Cl. .................... 296/107.17; 296/124; 296/121
(58) Field of Classification Search .................. 296/124, 296/125, 126, 128, 134, 224, 121, 107.12, 296/107.17, 107.01, 107.08; 292/137, 139, 292/145, 150, 163, 144, DIG. 11
See application file for complete search history.

(56) References Cited

U.S. PATENT DOCUMENTS

| | | | |
|---|---|---|---|
| 3,053,567 A * | 9/1962 | Geiger | 296/107.08 |
| 5,839,778 A | 11/1998 | Schaible et al. | |
| 5,868,454 A | 2/1999 | Homann et al. | |
| 6,033,008 A * | 3/2000 | Mattila | 296/107.17 |
| 6,120,070 A * | 9/2000 | Myers | 292/163 |
| 6,361,086 B1 | 3/2002 | Robbins et al. | |
| 6,796,595 B2 | 9/2004 | Doncov | |
| 2004/0061353 A1 | 4/2004 | Habacker | |
| 2006/0012213 A1 | 1/2006 | Habacker | |
| 2006/0038426 A1 | 2/2006 | Habacker | |
| 2006/0043759 A1 | 3/2006 | Habacker | |
| 2006/0197355 A1 | 9/2006 | Habacker et al. | |

FOREIGN PATENT DOCUMENTS

| | | |
|---|---|---|
| DE | 195 07 431 C1 | 8/1996 |
| DE | 195 33 802 C1 | 3/1997 |
| DE | 198 01 876 A1 | 7/1999 |

(Continued)

*Primary Examiner*—Glenn Dayoan
*Assistant Examiner*—Melissa A Black
(74) *Attorney, Agent, or Firm*—J-Tek Law PLLC; Jeffrey D. Tekanic (57) ABSTRACT

A locking device (10) for locking a convertible top (18) in its opened position comprises a catch element (14) and an opposing element (16) bringable into engagement therewith for locking, wherein the catch element or the opposing element is attached on the convertible top (18) and the other element of the catch element and the opposing element is borne on a vehicle body side. One element (14, 16) is displaceably borne in a retainer (20) and is biased in a locking direction by a biasing device (22). The retainer (20) is movable together with the biasing device (22) and with the element (14) borne in the retainer as a function of the movement of the convertible top (18) into an active position and into an idle position. In the active position, an engagement between the catch element and the opposing element is possible, which is excluded in the idle position.

20 Claims, 6 Drawing Sheets

FOREIGN PATENT DOCUMENTS

| | | |
|---|---|---|
| DE | 199 59 700 C1 | 2/2001 |
| DE | 199 44 615 A1 | 4/2001 |
| DE | 102 24 097 A1 | 12/2003 |
| DE | 103 24 071 A1 | 1/2004 |
| DE | 102 52 987 A1 | 6/2004 |
| WO | WO 2004/035337 A1 | 4/2004 |
| WO | WO 2004/035338 A1 | 4/2004 |
| WO | WO 2004/041572 A1 | 5/2004 |

\* cited by examiner

LOCKING DEVICE FOR A CONVERTIBLE TOP

CROSS-REFERENCE

This application is the US national stage filing of International Application No. PCT/DE2005/001826 filed Oct. 13, 2005, which claims priority to German patent application no. 10 2004 052 236.7 filed Oct. 27, 2004.

TECHNICAL FIELD

The invention generally relates to a locking device for a convertible top, with which a convertible top, for example, a convertible top storable in a Z-folded shape in the stored position, i.e. when the roof is opened, can be locked or secured in the roof opened position.

BACKGROUND ART

In convertible roofs that fold in a Z-folding shape, the forward roof segment lies in the same orientation in the storage position as in the closed position and constitutes the upper enclosure of the roof package in the storage position. When the roof is opened, the folded roof must be locked in the storage position without being able to resort to the convertible top compartment lid, onto which the locking elements could be affixed, as in conventional folded roofs.

In conventional folded roofs, such as the one described, e.g., in DE 102 52 987 A1, a hold-down clamp is provided on the convertible top compartment lid; the folded roof skin is held by the hold-down clamp in a secured state in the convertible top compartment. The hold-down clamp is formed by a counter member supported on the convertible top compartment lid and a support part provided on the folded-back convertible top.

A hard-top vehicle that possesses a two-part folding top having a forward roof part and a rear window part is known from DE 195 07 431 C1. Connection members to the windshield frame are provided on the forward roof part in order to attach the vehicle roof to the windshield frame in the closed roof position. When the roof construction is stored in the rear-side convertible top compartment, the connection members work together as a pair with the latching parts, which are supported in the rear portion of the vehicle in a body-affixed manner, and thus secure the folded-together roof construction. A roof construction is also known from DE 195 33 802 C1, in which the locking elements for securing the roof in the closed position also function as a locking device in the stored position.

Such a locking of the convertible top with the roof closure in the stored position is also employed for Z-folding roofs, which are described, e.g., in DE 198 01 876 A1 or DE 103 24 071 A1. More particularly, when a fully-automatic convertible top is folded into the Z-folding shape, the convertible top is also fixed with the roof closure in the stored position. However, this is difficult due to the limited accessibility when the convertible top closure is to be manually actuated or when the convertible top closure is disposed in the outer area of the roof tip.

SUMMARY OF THE INVENTION

The present teachings disclose a locking device for a convertible top that s may be independent of the closure device of the roof and which minimally interferes with the design of the convertible top. Moreover, the locking device preferably ensures that the roof is reliably secured when a Z-folding convertible top is utilized in a vehicle that does not include a convertible top compartment lid.

In one aspect of the present invention, a locking device is provided for locking a convertible top in its opened position. The locking device preferably comprises a catch element and an opposing element that is adapted to be brought into engagement with the catch element for locking the convertible top in its opened position. A first one of the catch element and the opposing element is attached to or is defined by the convertible top and a second one of the catch element and the opposing element is supported, preferably movably supported, by the vehicle body. In addition, one of the elements is preferably displaceably borne in a retainer and may be biased in a locking direction by a biasing device. In this case, the retainer may be movable together with the biasing device and with the element borne in the retainer as a function of the movement of the convertible top. In a more preferred aspect, the retainer and the element borne thereon preferably can be brought into an active position, in which active position an engagement between the catch element and the opposing element is possible, and also can be brought into an idle position, in which no engagement of the catch element and the opposing element is possible.

In another aspect of the present teachings, a locking device preferably comprises a catch element, e.g. a catch pin, and an opposing element that cooperates therewith, e.g., a catch hole, such that it is automatically brought into an active operation position by movement of the convertible top into the storage position and otherwise it is disposed in an idle position, in which it lies concealed in the storage area of the convertible top.

In addition to the movement of the catch element with an associated retainer into the active position, the assembly is preferably further arranged such that an automatic latching takes place by a continued movement of the convertible top into the storage position, i.e. the movement of the catch element is caused by the movement of the convertible top, wherein coupling members are preferably provided for transmission of the movement, and the catch element is brought into the catch position. For example, this can be caused by continued biasing of the pin in the catch direction by tensioning of a spring element. The movements of the element borne in the retainer into the active position as well as the movement of the catch element or the opposing element into the position, which is biased in the locking direction by the biasing device, are substantially in opposing directions.

Herein, the terms catch element and opposing element, respectively, refer in the broadest meanings thereof to all types of catch elements, which are formed by at least two parts that can engage with each other in an interactive manner, such that the convertible top can be secured relative to the vehicle body in the roof open position.

BRIEF DESCRIPTION OF THE DRAWINGS

In the following, the invention will be described in an exemplary manner with the assistance of the appended figures, in which.

DETAILED DESCRIPTION OF THE INVENTION

Figure 1:
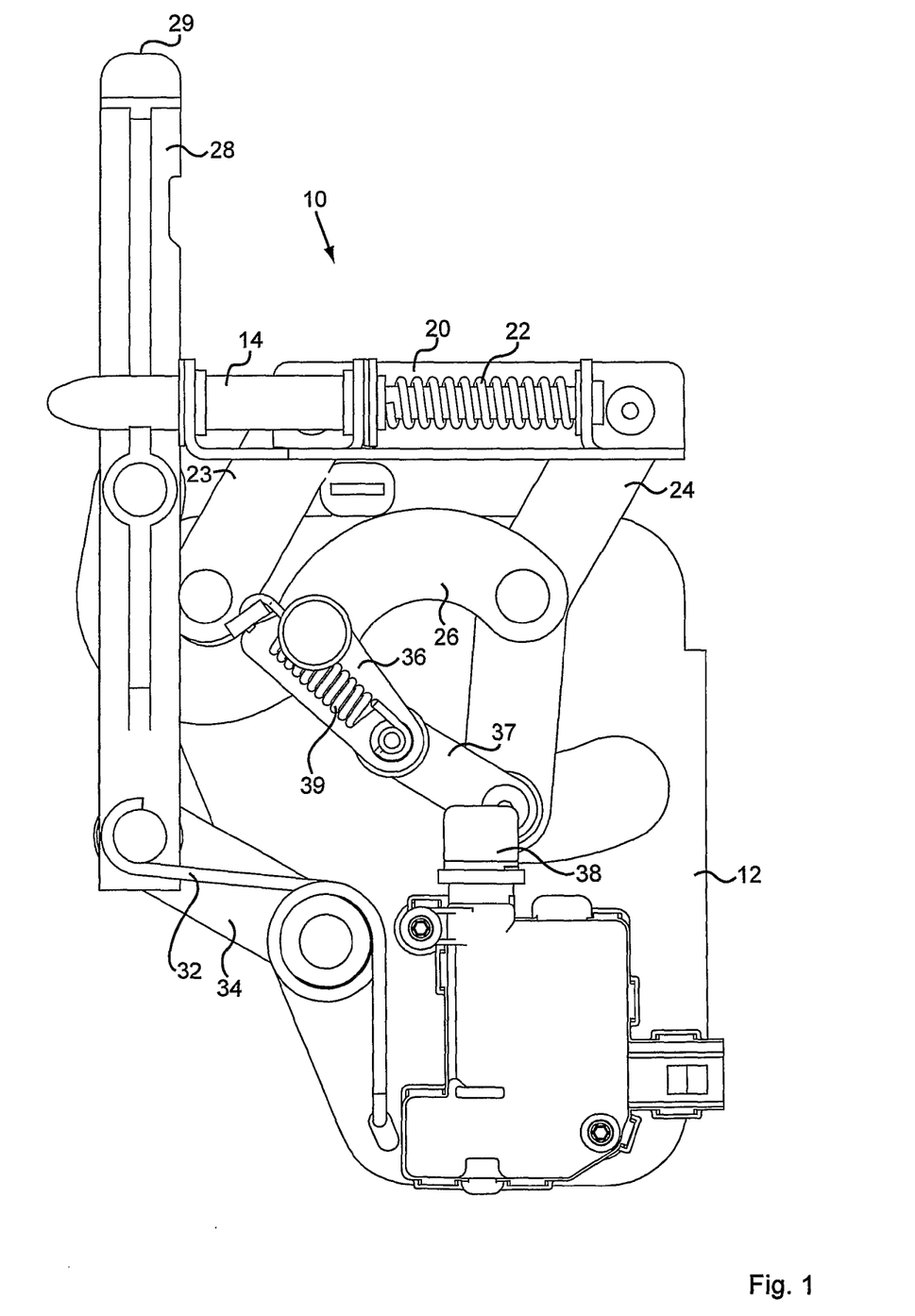
FIG. 1 shows the vehicle-body-side part of a locking device for a convertible top in an embodiment of the invention.

In FIG. 1, a locking device 10 is illustrated in a side view. The locking device 10 is surrounded by a cover 12 at least on two sides, wherein a front part of the cover is omitted in the Figure and only a rear part of the cover 12 is illustrated. The front cover 12 is formed so as to correspond to the rear cover 12. Side enclosures complete the cover 12, such that the movable elements lie substantially in the beaker-shaped cover. The cover 12 is rigidly connected with the vehicle body in the area of the receptacle for the convertible top.

Figure 2:
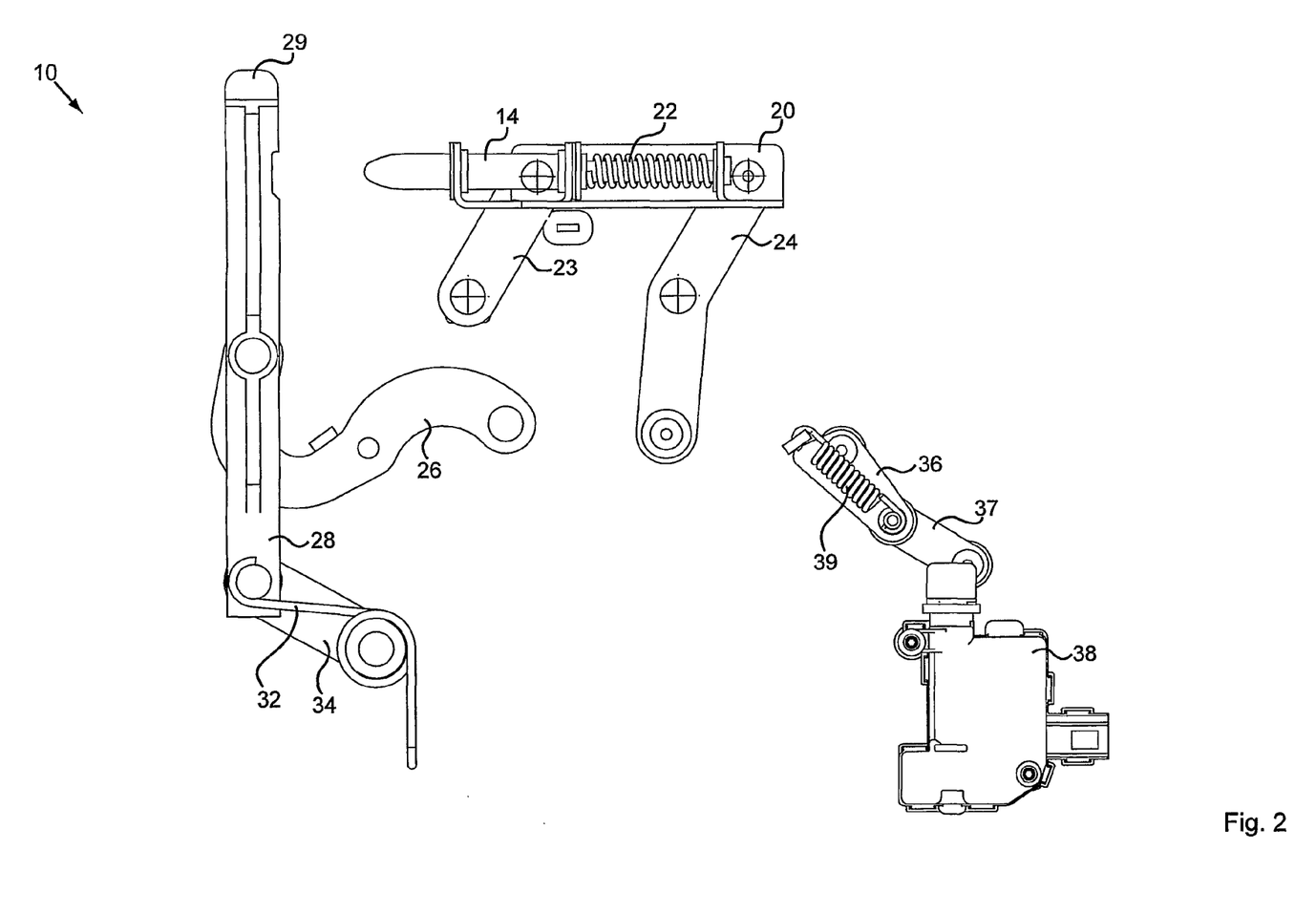
FIG. 2 is an exploded view of the locking device shown in FIG. 1.

FIG. 2 shows the locking device 10 without covers in an exploded view.

The locking device 10 comprises a catch pin 14, which cooperates together with a catch hole 16 provided on the side of the convertible top (see FIGS. 3 to 6) in order to fix the convertible top 18 relative to the not-illustrated vehicle body when the convertible top 18 should be stored in the open position of the convertible roof.

The catch pin 14 is translationally displaceably borne in a retainer 20, which is disposed in a substantially horizontal direction, so that the catch pin 14 can carry out an approximately horizontal displacement movement (left-right direction in FIGS. 1 and 2) in the retainer 20. Moreover, the catch pin 14 is borne such that it can be biased in a catch direction relative to the retainer 20 by using a helical spring 22; the catch pin 14 is latchable with the catch hole 16 in the catch direction.

More particularly, when the catch pin 14 is moved towards the right in FIGS. 1 and 2, the spring 22 is tensioned so that it biases the catch pin 14 in the catch direction (towards the left).

The retainer 20 for the catch pin is movably borne, for which a four-point linkage formed from levers 23, 24 is utilized. For this purpose, one end of the lever 23 is pivotably borne on the cover 12 and/or the vehicle body, while the other end is pivotably borne on the retainer 20. The lever 24, which is formed as a two-leg lever, is rotatably borne in an analogous manner on the cover 12 and/or the vehicle body at the crossover point of its legs 24, while a free end of the lever 24 is pivotably connected with the retainer 20. Thus, the retainer 20 can be pivoted from the position illustrated in FIG. 1, which corresponds to an idle position of the locking device 10, by pivoting the levers 23, 24 in the counter-clockwise direction about their respective bearing points on the vehicle body. The retainer 20 always remains in an approximately horizontal orientation due to the four-point linkage.

The rotational- or pivotal movement is initiated at the lever 24 by using an S-shaped lever 26; one free end of the S-shaped lever 26 is attached to the lever 24 and the other free end is rotatably borne on or attached to a rod-shaped pusher 28. The pusher 28 is displaceably borne on the vehicle body and/or the cover 12, wherein the displacement direction corresponds, e.g., to the vertical direction in the illustrated embodiment and thus is substantially perpendicular to the movement direction of the catch pin 14. A free end of the S-shaped lever 26 is preferably rotatably attached in a middle portion of the rod-shaped pusher 28. One end of the pusher rod 28 projects in the direction of the convertible top 18 (see FIGS. 2 to 6) when the convertible top approaches to its storage position for defining the open state of the convertible top. More particularly, an end face 29 of the pusher 28 arrives in contact with a corresponding opposing face 30 on the convertible top 18 when the convertible top 18 is brought, e.g. manually guided, into its storage position. In this final phase of loading the convertible top 18 into the storage position, the movement direction of the convertible top 18 substantially corresponds to the movement direction of the pusher (up-down direction in the Figures).

A torsion spring 32 is attached to the free end of the pusher 28 that is opposite to the end face 29; in FIG. 1, the torsion spring 32 is shown in its relaxed position. The torsion spring 32 is relaxed when the pusher 28 is extended as far as possible in the direction of the convertible top, i.e. when the convertible top 18 applies no force to the pusher 28. When the pusher 28 is further moved into the locking position, which is initiated by the convertible top 18 at the pusher 28 via the end face 29 (downward movement), the torsion spring 32 is tensioned. The torsion spring 32 is borne at a bearing point on the cover 12 affixed to the vehicle body, at which bearing point the lever 34 is also pivotably borne; the lever 34 is also rotatably connected with the end of the pusher 28 that is opposite of the end face 29, so that the pusher 28 is guided in translational movement.

The assembly further comprises an actuation device, which comprises two levers 36, 37, which are rotatably connected with each other as a knee lever, as well as an actuator 38 that is, e.g., driven manually or by a motor. One free end of the two connected-together knee levers 36, 37 of the actuation device is connected with a middle portion of the S-shaped lever 26, while the other is rotatably connected with the free end of the two-leg lever 24; the lever 24 provides a connection between the S-shaped lever 26 and the retainer 20. The actuator 38 can move the hinge position between the knee levers 36, 37 of the actuation device and can thereby move the S-shaped lever as well as the levers 23, 24 of the retainer 20. The angle between the S-shaped lever 26 and the lever 24 is thereby widened or narrowed. The actuation device further comprises a spring element 39 that biases the lever assembly of the actuation device such that the lever assembly is urged towards the idle position (widened arrangement) shown in FIG. 1. Thus, during the concluding actuation of the actuation device, the knee levers 36, 37 and the actuator 38 return to their starting position without application of additional force due to the effect of the spring element 39.

In the following, the manner of operating the locking device 10 will be described with the assistance of FIGS. 3 to 6.

Figure 3:
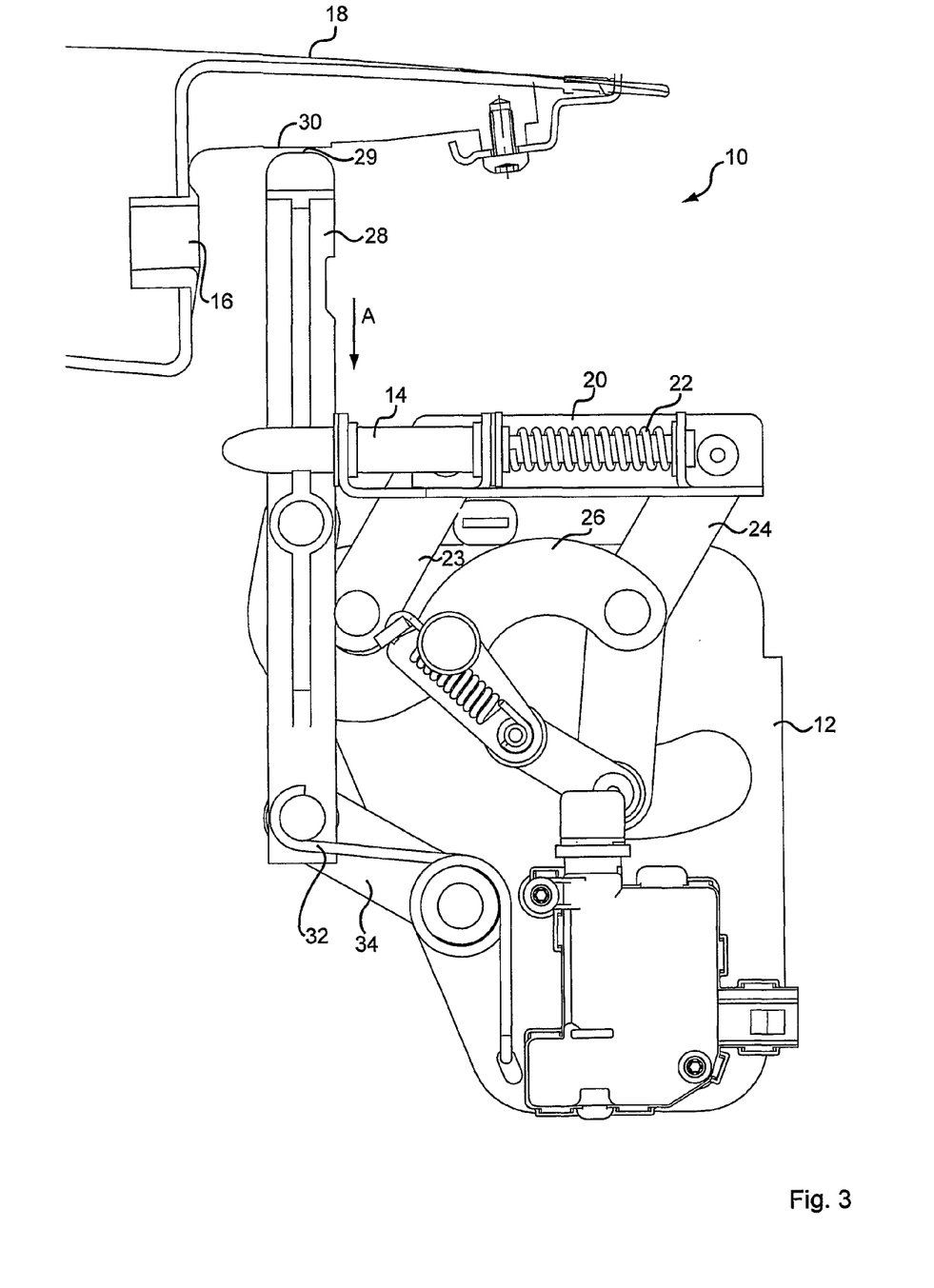
FIG. 3 shows the locking device in a first working position.

In FIG. 3, the state is shown, in which a convertible top 18 is stored in the storage area after opening the roof and should be locked. Thus, the convertible top 18 shown in FIG. 3 has been moved so far into the storage position that its surface begins to contact the end face 29 of the pusher 28. The locking device 10 can thus be attached to nearly any arbitrary position of the convertible top 18, as long as it can ensure sufficient locking forces, because the locking device 10 works substantially automatically and the user must have no access to it when locking.

Starting from the position illustrated in FIG. 3, in which the roof tip having the opposing face 30 contacts the end face 29, the spring force of the torsion spring 32 acts against a further closing movement of the convertible top 18 (movement towards the storage of the convertible top) and thus cushions the downward movement of the pusher 28 (arrow A in FIG. 3). At the same time, the spring 32 is increasingly tensioned when the pusher 28 is further moved in the movement direction A.

Figure 4:
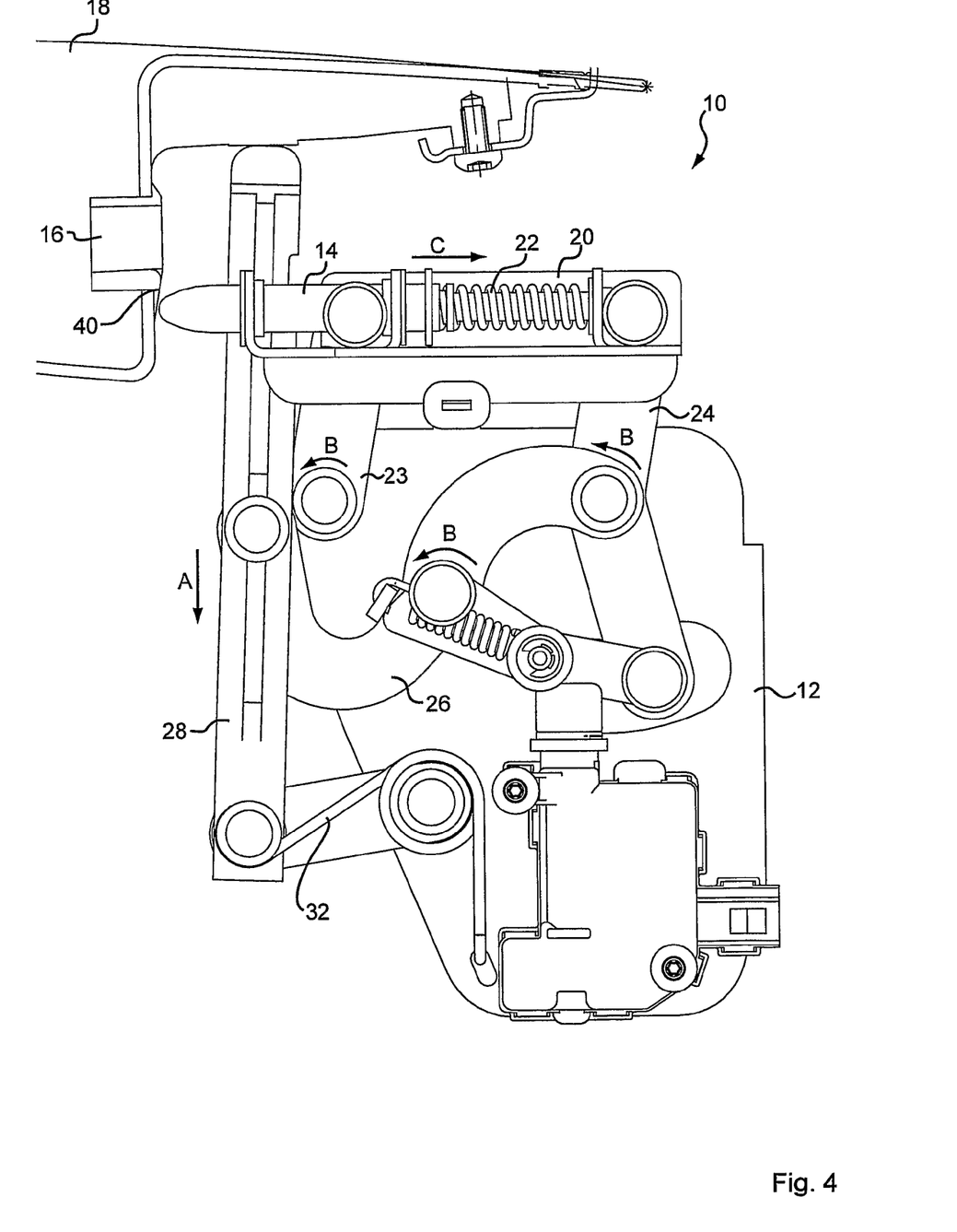
FIG. 4 shows the locking device when the storage procedure of the convertible top is further continued into the storage position.

In FIG. 4, the assembly is shown in a further continued closing position, i.e. immediately before the engagement of the catch pin 14 with the catch hole 16 on the convertible top 18. The S-shaped lever 26 is likewise pivoted by the continued movement of the pusher 28 in direction A and thus moves the lever 24 of the retainer 20 therewith, which remains or is displaced in a substantially horizontal state due to the four-point linkage of the levers 23, 24. The pivoting direction of the S-shaped lever 26, as well as the pivoting direction of levers 23, 24, is denoted by arrow B in FIG. 4. Due to the pivoting movement of the levers 23, 24 in the direction of arrow B, the retainer 20, which has the helical spring 22 and the catch pin 14 borne thereon, moves towards the catch hole 16, i.e. into an active position, in which an engagement between the catch pin 14 and the catch hole 16 is possible.

As a result, the tip of the catch pin 14 arrives in contact with the surrounding area of the catch hole 16, which surrounding area is formed as a sliding surface 40. The catch pin 14 is displaced in a translational manner (arrow C) relative to the retainer 20 due to the effect of the sliding surface 40, so that the spring 22 is tensioned and the catch pin 14 is biased in the latching direction.

Figure 5:
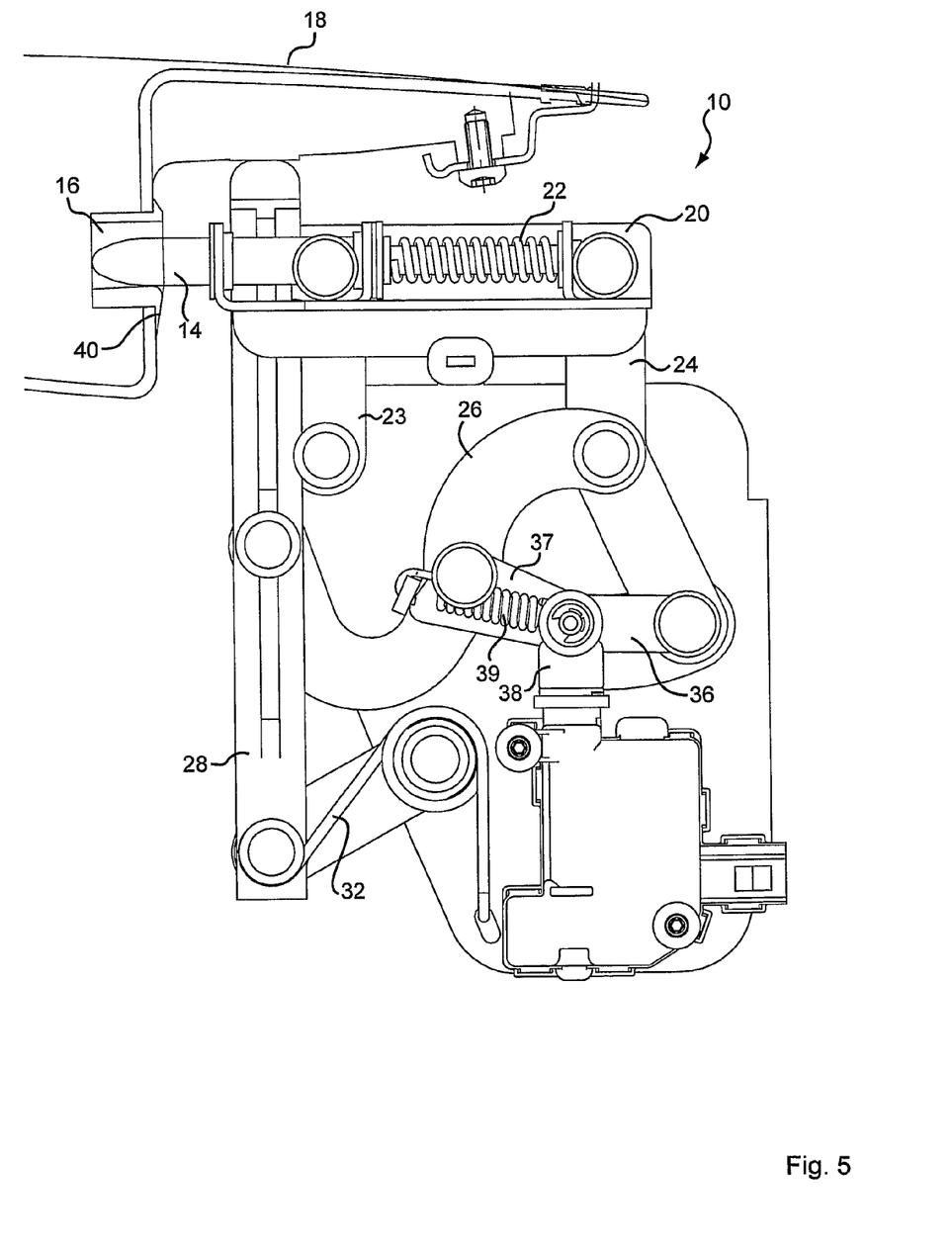
FIG. 5 shows the locking device in the catch position.

By a further continued movement of the convertible top 18 in the direction towards storage (arrow A), the pin 14 slides along the sliding surface 40 and the spring 22 is increasingly further tensioned, accompanied by further downward movement of the roof tip. Shortly before the roof tip has reached the fully-stored position (latching position), the tip of the catch pin 14 is pushed into the catch hole 16 by the tensioned push spring 22 (FIG. 5). This corresponds to the locking position of the convertible top 18.

Figure 6:
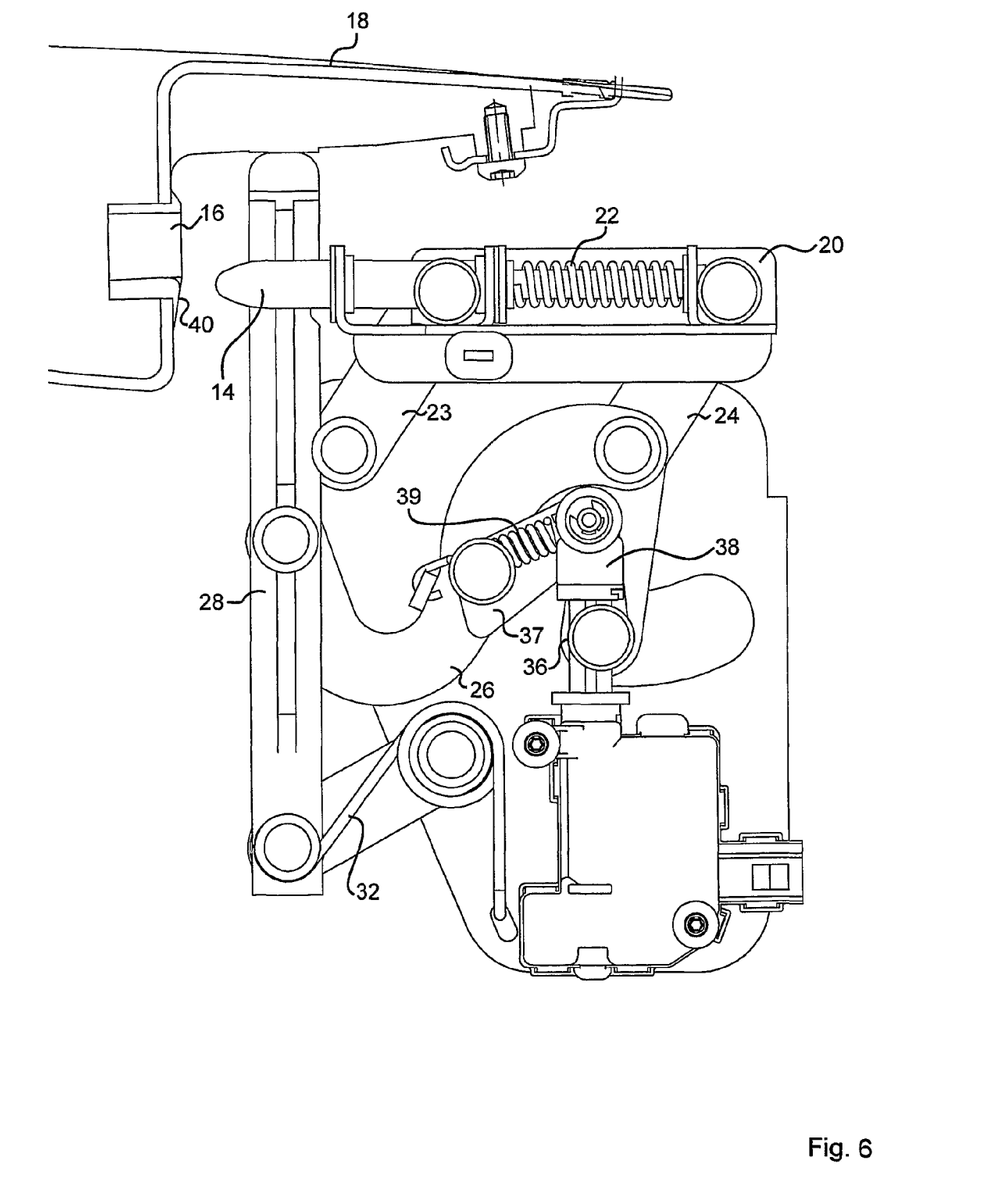
FIG. 6 shows the locking device after the release of the lock.

For releasing the latching position shown in FIG. 5, the actuator 38 of the actuation device is moved against the force of the spring element 39, which can take place by a motor or manually. The actuator 38 thus pushes the knee lever formed from the levers 36, 37 into the upper dead center position, whereby the S-shaped lever 26 is moved therewith, which moves the levers 23, 24 again into the idle position of the locking device and thus draws the catch pin 14 out of the catch hole 16 (FIG. 6). As soon as the catch pin 14 has left the catch hole 16, the torsion spring 32 can likewise return to its relaxed state, whereby the convertible top 18 is pushed upwardly by the pusher 28. Thus, the pusher, assisted by the torsion spring 32, contributes to supporting the movement of the convertible top 18 from the storage position into the closed position of the convertible top at least at the beginning of the movement.

REFERENCE NUMBERS

- 10 Locking Device
- 12 Cover
- 14 Catch pin
- 16 Catch hole
- 18 Convertible top
- 20 Retainer
- 22 Helical spring
- 23 Lever
- 24 Lever
- 26 S-shaped lever
- 28 Pusher
- 29 End face
- 30 Opposing face
- 32 Torsion spring
- 34 Lever
- 36 Knee lever
- 37 Knee lever
- 38 Actuator
- 39 Spring element
- 40 Sliding surface

The invention claimed is:

1. A locking device for locking a convertible top in an opened position, the locking device comprising:
    a catch element,
    an opposing element arranged and constructed to be brought into engagement with the catch element for locking the convertible top in the opened position, wherein one of the catch element and the opposing element is arranged and constructed to be attached to the convertible top and the other of the catch element and the opposing element is arranged and constructed to be supported by a vehicle body,
    a retainer displaceably bearing one of the catch element and the opposing element, and
    a biasing device biasing the element borne in the retainer in a locking direction,
    wherein movement of the convertible top during at least a final portion of movement of the convertible top into the opened position causes the retainer to move relative to the convertible top in a substantially horizontal direction into an active position together with the biasing device and with the element borne in the retainer, wherein an engagement between the catch element and the opposing element is possible in the active position, and the retainer is also movable into an idle position, in which no engagement of the catch element and the opposing element is possible.

2. A locking device according to claim 1, wherein:
    the catch element comprises a catch pin displaceably borne in the retainer and biased by the biasing device in the locking direction and
    the opposing element comprises a catch hole arranged and constructed to be attached to or defined in the convertible top.

3. A locking device according to claim 2, further comprising a catch area formed as a sliding surface at least partially surrounding the catch hole, wherein the catch area and the catch pin are arranged and constructed such that, as the convertible top is moved near to the opened position, the catch area presses the catch pin against the biasing force of the biasing device until the catch pin reaches a locking position where the biasing device is arranged and constructed to urge the catch pin into the catch hole.

4. A locking device according to claim 1, further comprising a pusher arranged and constructed to follow movement of the convertible top and coupling members arranged and constructed to transmit the movement to the retainer, the pusher being coupled with a spring element such that the spring element is tensioned when the convertible top is brought into a locking position.

5. A locking device according to claim 4, wherein the pusher is coupled with the retainer such that, during a translational movement of the pusher, which translational movement follows the movement of the convertible top into the locking position, the retainer, the biasing device and the element borne in the retainer are moved together into the active position.

6. A locking device according to claim 1, further comprising an actuation device arranged and constructed to cooperate with the retainer such that the retainer is moved together with the element borne thereon and with the biasing device out of engagement with the other element when the actuation device is actuated.

7. A locking device according to claim 1, wherein the retainer and the element borne thereon are arranged and constructed to always remain in an approximately horizontal orientation.

8. A locking device according to claim 1, further comprising a pusher arranged and constructed to be moved by the convertible top in a substantially vertical direction and coupling members arranged and constructed to transmit the substantially vertical movement of the pusher into substantially horizontal movement of the retainer.

9. A locking device according to claim 8, wherein the coupling members comprises a four-point linkage coupled to the retainer and an S-shaped lever coupling the pusher to the four-point linkage.

10. A locking device according to claim 1, wherein the catch element is displaceably borne in the retainer, the biasing device comprises a helical spring disposed around the catch element and the helical spring biases the catch pin towards the locking position relative to the retainer.

11. A locking device for locking a convertible top in an opened position, the locking device comprising:
   a catch element,
   a retainer movably supported by a vehicle body, the retainer supporting substantial linear movement of the catch element relative to the retainer,
   a biasing device biasing the catch element in a locking direction,
   an opposing element defined in or on the convertible top and being arranged and constructed to engage the catch element in a locking position so as to secure the convertible top relative to the vehicle body in the opened position, and
   a pusher arranged and constructed to be moved by the convertible top at least during a final stage of movement of the convertible top into the opened position,
   wherein the pusher is coupled with the retainer such that, during a translational movement of the pusher, which translational movement follows the movement of the convertible top into the locking position, the retainer, the biasing device and the catch element are moved together into the locking position.

12. A locking device according to claim 11, wherein the retainer and the catch element are arranged and constructed to always remain in an approximately horizontal orientation and to move in a substantially horizontal direction, and the locking device further comprises:
   coupling members arranged and constructed to transmit substantially vertical movement of the pusher into substantially horizontal movement of the retainer.

13. A locking device according to claim 11, wherein:
   the catch element comprises a catch pin and
   the opposing element comprises a catch area formed as a sliding surface at least partially surrounding a catch hole defined in the convertible top, and
   wherein the catch area and the catch pin are arranged and constructed such that, as the convertible top is moved near to the opened position, the catch area presses the catch pin against the biasing force of the biasing device until the catch pin reaches the locking position where the biasing device is arranged and constructed to press the catch pin into the catch hole.

14. An apparatus comprising:
   a catch element coupled to one of a convertible top and a vehicle body,
   an opposing element coupled to the other of the convertible top and the vehicle body, the opposing element being arranged and constructed to engage the catch element when the convertible top is disposed in a roof open position, and
   a pusher rod movably coupled to the vehicle body at a position where the convertible top induces the pusher rod to move during at least a final portion of downward movement of the convertible top into the roof open position, the pusher rod being coupled to at least one of the catch element and the opposing element such that said movement of the pusher rod causes the catch element and the opposing element to engage and thereby secure the convertible top relative to the vehicle body.

15. An apparatus according to claim 14, wherein said movement of the pusher rod is substantially perpendicular to movement of the one of the catch element and the opposing element that is coupled to the pusher rod.

16. An apparatus according to claim 14, wherein the pusher rod is coupled to one of the catch element and the opposing element via at least an S-lever.

17. An apparatus according to claim 14, further comprising:
   a retainer displaceably bearing one of the catch element and the opposing element, and
   a biasing device biasing the element borne in the retainer in an engaging direction.

18. An apparatus according to claim 14, wherein the pusher rod is coupled to one of the catch element and the opposing element such that, during a translational movement of the pusher rod, which translational movement follows the movement of the convertible top into the roof open position, at least one of the catch element and opposing element moves in a substantially horizontal direction.

19. An apparatus according to claim 14, wherein the catch element is a pin and the opposing element is a hole.

20. An apparatus according to claim 14, further comprising a spring biasing the pushing rod in a direction towards the convertible top.

* * * * *

UNITED STATES PATENT AND TRADEMARK OFFICE
CERTIFICATE OF CORRECTION

PATENT NO. : 7,780,218 B2   Page 1 of 1
APPLICATION NO. : 11/666483
DATED : August 24, 2010
INVENTOR(S) : Norbert Habacker

It is certified that error appears in the above-identified patent and that said Letters Patent is hereby corrected as shown below:

Title Page, Item (30) Foreign Application Priority Data:

"10 204 052 236" should read --10 2004 052 236--.

Signed and Sealed this

Twelfth Day of October, 2010

David J. Kappos
*Director of the United States Patent and Trademark Office*